United States Patent [19]

Millman

[11] 4,319,978

[45] Mar. 16, 1982

[54] SPACER FOR ELECTRODIALYSIS STACK

[75] Inventor: William G. Millman, Middlebury, Conn.

[73] Assignee: Lea Manufacturing Company, Waterbury, Conn.

[21] Appl. No.: 221,673

[22] Filed: Dec. 30, 1980

[51] Int. Cl.$^3$ ............................................... B01D 13/02
[52] U.S. Cl. ................................................... 204/301
[58] Field of Search ............................ 204/180 P, 301

[56] References Cited

U.S. PATENT DOCUMENTS

| | | | |
|---|---|---|---|
| 2,758,083 | 8/1956 | Van Hoek et al. | 204/180 P X |
| 2,784,158 | 3/1957 | Bodamer et al. | 204/180 P X |
| 3,761,386 | 9/1973 | Smith | 204/301 |
| 3,869,375 | 3/1975 | Ono et al. | 204/301 |
| 3,878,086 | 4/1975 | Haswell et al. | 204/301 |

Primary Examiner—Howard S. Williams
Attorney, Agent, or Firm—Robert L. Goldberg

[57] ABSTRACT

An improved spacer for use in an electrodialysis stack, the spacer comprising an inner ply, two intermediate plies, and two outer plies of a compressible material. These plies are held together by a water-resistant, pressure-sensitive adhesive with the inside of each intermediate ply being bonded to a side of the inner ply and each outer ply being bonded to the outside of an intermediate ply. The resulting spacer is assembled into an electrodialysis stack alternating with anion and cation selective membranes, the spacer and membranes being held in place by externally applied pressure to form a stack which is free from cross-leaking and seepage problems, and yet readily disassembled for servicing.

18 Claims, 6 Drawing Figures

SPACER FOR ELECTRODIALYSIS STACK

BACKGROUND OF THE INVENTION

1. Field of the Invention

This invention relates to apparatus for recovering charged ions from solution, and, more particularly, to a novel spacer for use in assembling multicell electrodialysis stacks.

2. Description of the Prior Art

Electrodialysis is a well known electrochemical process whereby a solution to be treated is passed between an anode and cathode. Appropriate ion-permeable membranes are placed between the solution to be treated and the respective electrodes so that the anions tend to be drawn toward the anode and cations toward the cathode. Thus, a feed stream being treated is diluted with respect to these ions. On each side of the compartments through which the feed stream is caused to flow, that is on the other side of each ionic membrane from the feed stream, is a "concentrate" or "product" compartment wherein the ions are concentrated. Specially designated spacers separate the membranes in an attempt to form leak-tight flow directing compartments between adjacent membranes, and the entire assembly is held in compression by a pair of end plates and tie-rods or other clamping devices. The compartments or cells formed by the spacers are typically 1–1.5 mm thick and direct the solution fed to the cell over the surfaces of the membranes either in torturous path or sheet flow pattern. The flow path usually contains a plastic screen or supporting baffles to insure separation of the membranes and induce turbulent flow. A stainless steel sheet is commonly used for the cathode and platinized titanium for the anode.

An example of such an electrodialysis stack is shown in U.S. Pat. No. 3,878,086, issued Apr. 15, 1975 entitled "Electrodialysis Stack and Spacer for use therein," incorporated herein by reference. That patent describes an electrodialysis stack and the method of constructing the same, wherein a multiply membrane spacer is used, the spacer consisting of relatively thin exterior plies formed of a more rigid material than is the interior ply. These exterior plies are held together by a water resistant pressure adhesive. The resulting spacer is then preferably adhesively bonded to cationic and anionic membranes on each side thereof, and thereby form a part of an essentially solid laminar dialysis stack.

These spacers are then placed in a stack alternating between feed spacers and product spacers to form the entire stack.

The ion-permeable membranes used in such a stack are made of a material which has a relatively low tear strength. Accordingly, attempts to remove the membrane from the spacer result in tearing within the membrane material itself, rather than at the adhesive bond as described in the U.S. Pat. No. 3,878,086 mentioned above at column 2, line 53 through column 3, line 38. As discussed therein, beginning at column 3, line 16, such a stack can be put together without an adhesive bond between the spacer and the membrane when the stack is to be used for test work, to be broken down for inspection, or to be broken down to change the flow characteristics by changing to different turbulence promoters. However, some leaking will almost invariably occur since the materials which make up the spacer are not of sufficient compressibility to provide a relatively tight seal. As stated at column 3, line 26 through line 38, unique stacks can be formed of modules consisting of membranes sealed to spacers as shown at column 5, lines 12 through 25, the preferred method was to use adhesive on both sides of the membranes so that the stack formed a solid block. In that way, leakage to the stack or intrastream "short-circuiting" was asserted to be virtually eliminated.

Although the attainment of a leak-proof stack is the ultimate goal, providing such by using a stack wherein the spacers are adhesively bonded presents a number of problems when servicing is required. Depending upon the type of membrane used and the solution to be treated, the stacks must be disassembled periodically for maintenance and replacement of the membranes and other components. In the situation in which all the membranes and spacers are bonded as a single unit, many of the membranes which might be reused become torn and must be replaced. This is particularly costly when a membrane fails relatively early in the use cycle of the stack. Although it has been suggested to assemble such a stack without using an adhesive to hold membranes in place, such stacks suffer from leakage to the outside with the concomitant waste and loss of material.

SUMMARY OF THE INVENTION

In accordance with the present invention, an apparatus is provided in which the spacer for use in a stack comprises an inner ply having therein ports partially forming inlet and outlet manifold conduits, a primary flow path to allow the liquid to contact the membrane surface, and channels connecting the inlet and outlet ports to the primary flow path. On each side of the inner ply and bonded thereto, are intermediate plies which comprise matching inlet and outlet ports also forming part of the manifold conduits and which comprises also a flow path generally congruent with that of the inner ply. A flow distributor means, e.g. a plastic grid or mesh such as that shown in U.S. Pat. No. 3,761,386, incorporated herein by reference, is fitted into the primary flow path. The flow distributor means can extend into the channels connecting the inlet and outlet ports to the primary flow path, or in the alternative, a separate insert can be placed in the channel to prevent the intermediate plies from sticking together and closing or restricting the cross-sectional area of the channel. A preferred arrangement is having the channels machined directly into the inner ply.

The multiply spacer comprises an inner ply of polyethylene or similar material preferably of high density material, sandwiched between two intermediate reinforcing plies of a relatively high modulus material, e.g. a polyester terephthalate such as that sold under the trade designation Mylar by Dupont or the like. The reinforcing plies can be relatively thin when compared to the inner ply. However, the intermediate plies must be sufficiently rigid to prevent substantial restriction of the cross sectional area of the channels connecting the inlet and outlet ports to the primary flow path.

Each ply of the spacer comprises a cut-out portion which forms a flow path for feed or concentrate fluid. In the flow path is a flow directing and turbulence promoting means, usually a flexible plastic grid such as that described above. The intermediate plies described above are preferably coated on both sides with adhesive and then used to sandwich the inner ply. To the side of each of the intermediate plies opposite the inner ply is adhered a relatively flexible and compressible outer ply, neoprene or other compressible rubber which is generally chemically inert to the strongly acidic and basic substances typically present in the feed and concentrated solutions. While any compressible rubber having the above properties can be advantageously employed in the present invention, it is preferred that it have durometer of about 60–80 to provide a leak-tight stack without the use of excessive pressure. The outer plies have the same configuration as the intermediate plies.

In practice the spacer is generally formed in place on a stack beginning with an outer ply. On top of the outer ply is placed an intermediate ply which was an adhesive coating on both sides thereof, followed by the inner ply, another intermediate ply coated on both sides with adhesive, and finally an outer ply. Accordingly, a completed spacer comprises an outer ply bonded to the outside of each intermediate ply, with the inside of each intermediate ply being bonded to one side of an inner ply. This combination forms a spacer which then can be assembled into a stack utilizing alternating cation and anion selective membranes.

The stack is typically assembled starting with the anode on the bottom, typically platinized titanium, which is formed in such a manner that the electrode can be continually rinsed to remove products of electrode reaction. A portion of the feed or concentrate solutions can be used as a rinse or a special rinse solution can be prepared and recycled independent of the process streams. Bolts extending upward from the anode serve as guides for the spacers and membranes which have corresponding holes cut in them to produce the proper alignment. Next an anion selective membrane is placed, followed by a feed spacer, a cation selective membrane, a product spacer, an anion selective membrane, a feed spacer, etc. continuing to alternate until the entire assembly is capped by a cathode typically made of stainless steel and also having means for an electrode rinse to remove products of electrode reaction and prevent plating or precipitation of insoluble species. By using compressible material, such as neoprene, for the outer plies of the spacer, it is possible to produce a leak-proof stack which is readily disassembled for servicing and replacement of any torn or defective membranes, without the concomitant destruction of membranes that often occurs in the prior art.

DESCRIPTION OF THE PREFERRED EMBODIMENT

Figure 1:
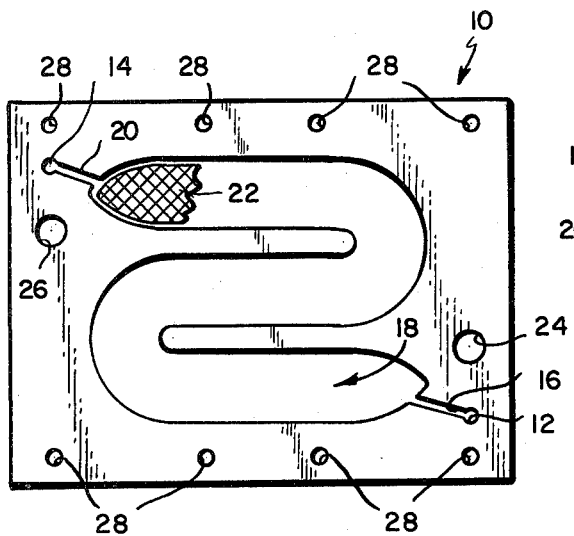
FIG. 1 is a side elevation of the inner ply of a product spacer formed according to the invention.
Figure 2:
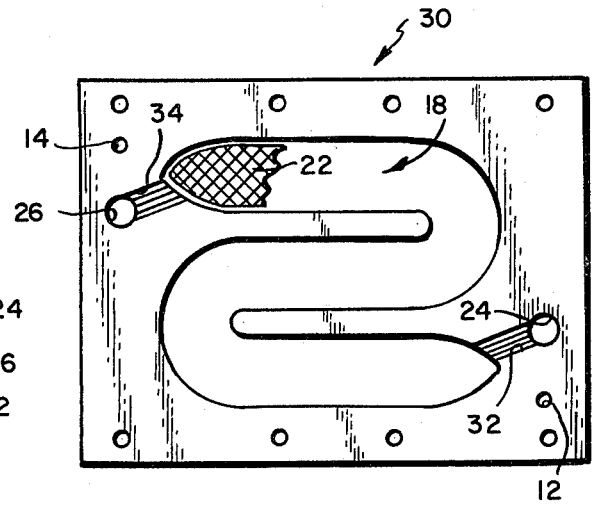
FIG. 2 is a side elevation of the inner ply of a feed spacer formed according to the invention.

FIGS. 1 and 2 disclose the inner ply of a product spacer 36 and a feed spacer 48, respectively. A product inner ply 10 is die cut from a high density polyethylene sheet to have a product inlet port 12 and a product outlet port 14 Inlet 12 is connected by a manifold product inlet channel 16 to serpentine flow path 18 which terminates in a manifold product outlet channel 20 and outlet 14. As indicated in FIG. 1, flow path 18 comprises a turbulence-promoting and fluid-velosity conditioning means in the form of a woven polymeric mesh 22 or similar means. Mesh 22 can be removable or replaceable or can be fixed e.g. molded in the polyethylene sheet. Preferably mesh 22 is made of a low density polyethylene. Product inner ply 10 also has feed inlet port 24 which forms a part of the tube through which feed solution flows in and feed outlet port 26 through with feed solution flows out of the stack. Finally, bolt holes 28 along the edges of product inner ply 10 allow bolts to be placed through the entire stack to fasten it together as a unit.

FIG. 2 discloses a side elevation of feed inner ply 30. Feed inner ply 30 comprises the same general shape as shown for product inner ply 10 with the exception that channels run between the manifold feed inlet port 24 and manifold feed outlet port 26 and flow path 18. Manifold feed inlet channel 32 between manifold feed inlet port 24 and flow channel 18, and manifold feed outlet channel 34 between manifold feed outlet port 26 and flow path 18, are typically larger in cross-sectional area than channels 20 and 16 since the volume of feed solution is typically much greater than the volume of product solution. Because of this greater cross-sectional area, it is necessary to include some type of spacer to prevent intermediate plies 38 from touching each other, thereby restricting or closing channels 32 and 34. Such a spacer can take any of the number of forms, eg. it can be an extension of mesh 22 or it can be a separate insert having ridges parallel to the direction of flow of the feed solution. Most preferably, it comprises a series of parallel sub-channels which are machined to two-thirds of the depth of feed inner ply 30. In that manner, mesh 22 can be of the same configuration for both product inner ply 10 and feed inner ply 30. In addition, the number of components required for assembly is decreased, and the chance that such an insert will slip sideways, thereby partially or totally blocking inlet port 24 or outlet port 26, is eliminated.

Figure 4:
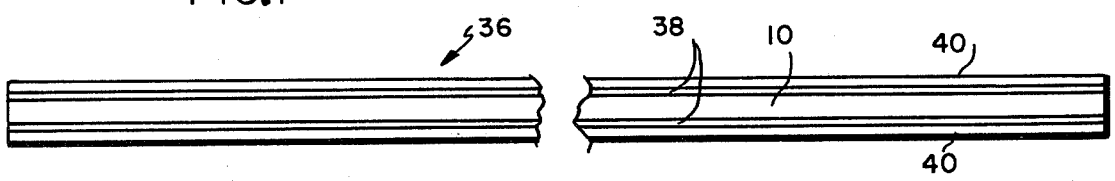
FIG. 4 is an end view of an assembled product spacer of the present invention.
Figure 3:
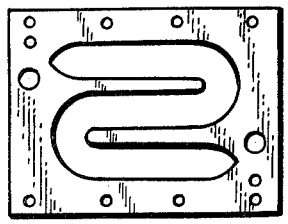
FIG. 3 is a side elevation of the intermediate and outer plies of a spacer.

FIG. 4 is a fragmentary end view of an assembled product spacer of the present invention. Product inner ply 10 is sandwiched between intermediate plies 38 and adhered thereto by a pressure sensitive adhesive. Finally outer plies 40 are adhesively bonded to the other side of intermediate plies 38 to complete product spacer 36. Intermediate ply 38 and outer ply 40 have the same general shape as product inner ply 10 and feed inner ply 30 except that there are no channels running between flow path 18 and inlet ports 12 and 24 and outlet ports 14 and 26. The shape of intermediate ply 38 and outer ply 40 is illustrated in FIG. 3. An end view of an assembled feed spacer 48 would appear exactly the same as FIG. 4 except that product inner ply 10 would be replaced by feed inner ply 30.

Figure 5:
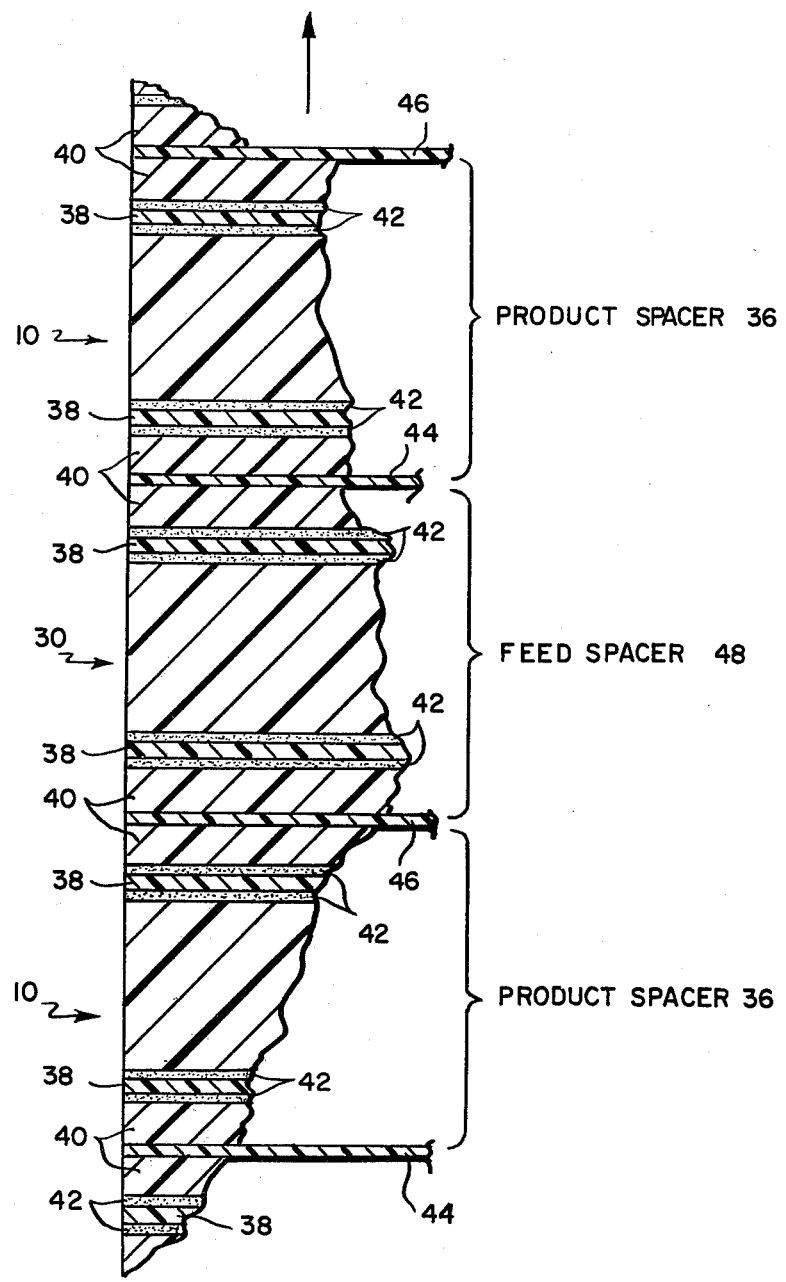
FIG. 5 is an enlarged and fragmentary end view of a part of an assembled electrodialysis stack utilizing spacers and membranes according to the present invention.

FIG. 5 is an expanded fragmentary side view of a section of the middle of an assembled electrodialysis stack employing the spacer of the present invention. As shown in FIG. 5 a feed spacer 48 appears in the middle with a product spacer 36 on either side, with portions of additional feed spacers 48 on either side of the product spacers 36 seen at the top and bottom of FIG. 5. Beginning from feed inner ply 30 in the middle of FIG. 5 and proceeding upwards in the direction of the arrow at the top of FIG. 5, feed inner ply 30 is bonded to intermediate ply 38 by pressure sensitive adhesive 42. Adhesive 42 is advantageously a water-insoluble organic polymer based pressure adhesive which is substantially free of volatile solvents. One suitable commercial adhesive is that sold under the trade designation ARCLAD S-6319 by Adhesive Research Incorporated of Glen Rock, Pa. Adhesive 42 is also used to bond intermediate ply 38 to outer ply 40. Cation selective membrane 44 is held in place without adhesive by means of pressure exerted by bolts running through the entire stack which are secured on the outside of the cathode and the anode of the stack as described below. Outer ply 40 of product spacer 36 is adhesively bonded to intermediate ply 38 by means of adhesive 42 which also binds intermediate ply 38 to product inner ply 10. Proceeding upward, the same arrangement is seen with anion selective member 46 held between the next two outer plies 40. Similarly, proceeding downward from feed inner ply 30 in the middle of FIG. 5, intermediate ply 38 is adhesively bonded on one side to feed inner ply 30 and on the other side to outer ply 40, and anion selective membrane 46 is held between outer ply 40 of feed spacer 48 and outer ply 40 of product spacer 36.

The shape of ion selective membranes 44 and 46 is the same as shown in FIG. 3 with the exception that flow path 18 is not present.

Inner plies 10 and 30 are about 0.070 inch thick, intermediate ply 38 is about 0.0075 inch thick, and outer ply 40 is about 0.016 inch thick. Anion selective membrane 46 and cation selective membrane 44 can be any of the membranes well known in the prior art. Such membranes are typically formed as thin sheets of ion-exchange material, usually reinforced by a synthetic fabric backing to provide the necessary strength. Thickness can vary between one-tenth to almost one millimeter. While any of the membranes known in the prior art may be employed, preferred resin matrices are styrene or vinylpyridine copolymerized and cross-linked with divinylbenzene with the exchange capacity being imparted by sulfonic acid, or quaternary ammonium or pyridinium groups convalently bonded to the polymeric backbone.

Outer ply 40 is preferably made of neoprene or other rubber having similar characteristics. However, in applications where solutions having strong oxidative potential are being treated, e.g. chromic acid plating bath, it is preferred that outer ply 40 be made of a special type of rubber sold under the trademark Viton by E. I. Dupont de Nemours, which is also sold under the trademark Fairprene when it is sold as elastomer coated fabric. Viton is a fluoroelastomer which is a copolymer of vinylidene fluoride and hexafluoropropylene.

Figure 6:
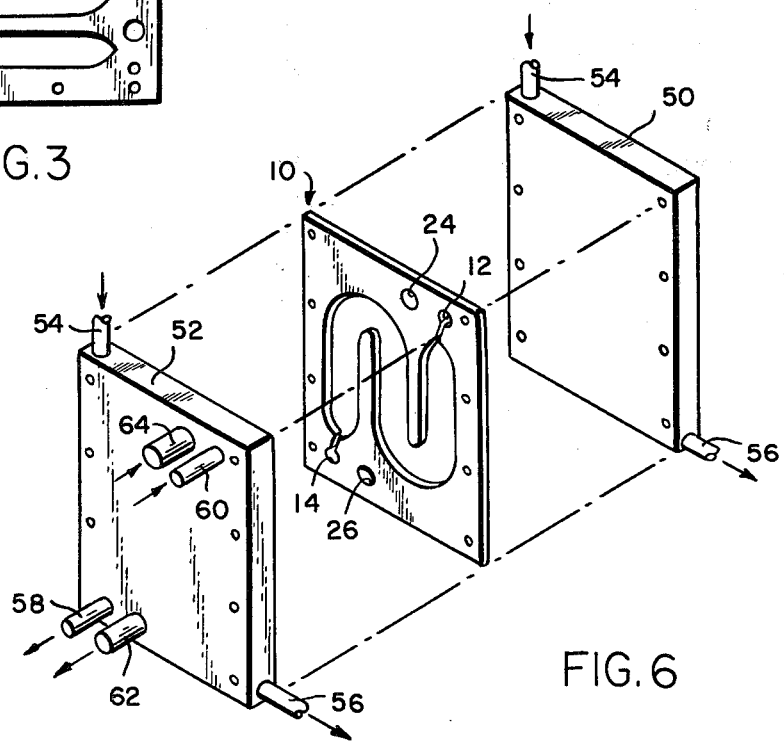
FIG. 6 illustrates schematically the placement of a spacer within the stack.

FIG. 6 illustrates schematically the arrangement of product inner ply 10 within an assembled stack. Feed spacers 48 and product spacers 36 are placed within the completed stack in such a manner that flow paths 18 are congruent through the entire stack. Normally, there will be four manifold-type flow tubes, one each for feed inlet 64, feed outlet 62, product inlet 60 and product outlet 58. In some applications there is no need for a product inlet as all of the materials to be discharged from the concentrate cells will have passed thereinto through the membranes. In such a case both product tubes serve to allow product to flow out of the stack. The electrodialysis stack will often have terminal electrode housing compartments 50 and 52 which will be provided with rinse inlet 54 and rinse outlet 56 to circulate rinse solutions thereto as is known in the art. In operation the feed solution is pumped under pressure through feed inlet 64 and thus through the tube formed by feed inlet 24 in each of the plies and membranes which combine to form a tube comprising a series of short cylindrical portions. The wall of the tube is thus broken only where each feed inner ply 30 is located allowing the feed solution to pass through the channel 32 into flow path 18. Similarly, feed outlet ports 26 in each the plies and the membranes produce a tube through which the feed solution flows out of the stack. The tube through which product flows is similarly formed by product inlet ports 12 and product outlet ports 14.

In assembling the stack, bolts are passed through the entire stack and are secured on the outside of the anode and the cathode by means of end plates and tie rods or other such means. A typical stack might contain 35 cell-pairs for which about 150 inch pounds of torque would be used on each fastening nut to provide a leak-proof stack. While the required pressure will vary depending as the depth of the stack, determining the correct pressure to apply in any particular situation is a simple matter of tightening until a leak-proof stack is obtained.

Changes and modifications in the specifically described embodiment can be carried out without departing from the scope of the invention which is intended to be limited only by the scope of the following claims.

What is claimed is:

1. A flow directing spacer for use between the cationic and anionic selective membranes of electrodialysis apparatus comprising an inner ply, two intermediate plies and two compressible outer plies, wherein the inside of each of said intermediate plies is bonded to a side of said inner ply, and the outside of each of said intermediate plies is bonded to one of said outer plies, wherein said bonds are formed of a pressure sensitive adhesive and wherein a turbulence promoting means is placed within a flow path defined by an aperature in said spacer, the aperature being the depth of the five said plies.

2. The spacer of claim 1 wherein said outer plies have a durometer of about 60-80.

3. The spacer of claim 1 wherein said outer plies are formed of neoprene.

4. The spacer of claim 1 wherein said outer plies are formed of a copolymer of vinylidene fluoride and hexafluoropropylene.

5. The spacer of claim 1, 2, 3, or 4 wherein said inner ply is formed of a polyolefin and said intermediate plies are formed of polyester terephthalate.

6. An electrodialysis apparatus comprising anion and cation selective membranes and spacers, as defined in claim 1, wherein said membranes are held in place between said spacers by pressure.

7. The apparatus of claim 6 wherein said pressure is exerted by bolts extending from the bottom of said apparatus through all of said membranes and said spacers, through the top of said apparatus.

8. The apparatus of claim 6 wherein said membranes are derivatives of styrene or vinylpyridine copolymerized and cross-linked with divinylbenzene.

9. A multi-ply membrane flow directing spacer of claim 1 for use between the ion selective membranes of an electrodialysis stack including (1) an inner ply defining a primary flow path, manifold defining inlet and outlet ports, and channels connecting said flow path to said inlet and outlet ports, (2) two intermediate plies and two compressible outer plies defining the same primary flow path configuration and manifold defining inlet and outlet ports but being free of any channel connecting said flow path and said inlet and outlet ports.

10. The spacer of claim 9 wherein the plies are bonded to one another by a pressure-sensitive adhesive means.

11. An electrodialysis apparatus comprising anion and cation selective membranes and spacers defined in claim 9, wherein said membranes are held in place between said spacers by pressure.

12. The apparatus of claim 11 wherein said pressure is exerted by bolts extending from the bottom of said apparatus through all of said membranes and said spacers, through the top of said apparatus.

13. The apparatus of claim 11 wherein said membranes are derivatives of styrene or vinylpyridine copolymerized and cross-linked with divinylbenzene.

14. The spacer of claim 9 wherein said outer plies have a durometer of about 60–80.

15. The spacer of claim 9 wherein said outer plies are formed of neoprene.

16. The spacer of claim 9 comprising a flow-distributing means substantially throughout said flow path.

17. The spacer of claim 16 wherein said outer plies are formed of a copolymer of vinylidene fluoride and hexafluoropropylene.

18. The spacer of claims 9, 14, 15, or 17 wherein said inner ply is formed of a polyolefin and said intermediate plies are formed of polyester terephthalate.

* * * * *